United States Patent [19]
Pagdin

[11] 3,822,922
[45] July 9, 1974

[54] BRAKING SYSTEMS

[75] Inventor: Brian Colin Pagdin, Sutton Coldfield, England

[73] Assignee: GKN Transmissions Limited, Erdington, Birmingham, England

[22] Filed: Jan. 5, 1973

[21] Appl. No.: 321,472

[30] Foreign Application Priority Data
Jan. 5, 1972   Great Britain .................. 435/72

[52] U.S. Cl. ........................... 303/24 A, 303/6 C
[51] Int. Cl. ................................................ B60t 8/14
[58] Field of Search ........ 303/24, 21 F, 21 R, 21 A, 303/21 AF, 21 CF, 21 CH, 21 C, 6 R, 6 C, 22 AU; 188/181 AU

[56] References Cited
UNITED STATES PATENTS

| | | | |
|---|---|---|---|
| 2,953,413 | 9/1960 | Jankauskas | 303/24 F |
| 3,164,415 | 1/1965 | Stelzer | 303/24 R |
| 3,539,227 | 11/1970 | Drutchas et al. | 303/21 F |
| 3,582,153 | 6/1971 | Pitcher | 303/24 C |
| 3,715,145 | 2/1973 | Harneol et al. | 303/21 F |

Primary Examiner—Duane A. Reger
Assistant Examiner—D. C. Butler
Attorney, Agent, or Firm—Spencer & Kaye

[57] ABSTRACT

An anti-skid braking system for a vehicle in which a control mass is mounted on the vehicle chassis to be movable relative thereto and is arranged to control the servo assistance in dependence on the position of the control mass relative to the chassis. The greater the retardation the greater the servo assistance and the less the retardation the less the servo assistance. The control mass may be the engine and gearbox of the vehicle which is mounted resiliently on the chassis. The servo assistance can be obtained directly from the control mass or by a servo pump whose output is metered by the control mass.

4 Claims, 6 Drawing Figures

BRAKING SYSTEMS

BACKGROUND OF THE INVENTION

1. Field of the Invention

This invention relates to braking systems for vehicles and is concerned with an anti-skid braking system.

2. Description of the Prior Art

A number of anti-skid braking systems are known. In some of these systems there is provided sensing means which sense when the rotational speed of a wheel is less than that expected for a given speed of the vehicle, i.e., the wheel is about to lock. Upon sensing this condition, the sensing means influences the remainder of the system to reduce the braking force, i.e., the force tending to lock the wheel, thus to prevent skidding. In such systems there is a delay, albeit short, between the sensing of when a wheel is about to lock and the reduction in the braking force.

It is an object of the present invention to provide a simple anti-skid vehicle braking system in which this delay is reduced.

SUMMARY OF THE INVENTION

According to the invention we provide a braking system for a vehicle comprising wheel braking means, a brake actuator for driver-operation and arranged, when operated, to activate the wheel braking means, a servo mechanism interposed between the actuator and said braking means to magnify the force applied to the actuator and apply the magnified force to the braking means, and control means to vary the force magnification effected by the servo mechanism and comprising a control mass whose position relative to the vehicle chassis depends on the rate of retardation of the vehicle by the wheel braking means when actuated, the control means being arranged so that said magnification varies directly with said rate of retardation from zero up to values which, under predetermined conditions, can cause the vehicle to have a predetermined retardation characteristic.

Thus, to take one extreme example, if the brakes are applied while the vehicle is on ice so that there is no retardation there will be no change in the relative positions of the control mass and the chassis and the magnification of the actuating force will be unity.

In the opposite extreme example, under said predetermined conditions, which will normally correspond to a dry road with a good surface, operation of the braking means will cause retardation of the vehicle and a change in the relative positions of the chassis and the control mass and the change in position will be such that the force magnification obtained will result in the maximum rate of retardation for which the system is designed.

In a further example, if there is a servo-magnification in operation as the vehicle is being retarded and if the road surface should suddenly change so that the rate of retardation increases or decreases then the servo-magnification will also be increased or decreased as the case may be. If the vehicle passes over a path of road where there is a slippery surface, the servo-magnification will decrease as the vehicle moves onto said patch and will increase as the vehicle moves off said patch.

The relative movement between the control mass and the vehicle chassis during said change in relative position may itself provide the servo assistance. For example the control mass may comprise the vehicle engine and gear box and the servo assistance be obtained by using the relative movement between the engine and gear box on the one hand and the chassis on the other to provide the servo force. Thus, for example, a cylinder could be mounted on a rigid part of the chassis and contain a piston connected by tension links to the engine. Upon retardation of the vehicle, the engine will tend to move forward relative to the chassis thus moving the piston in the cylinder and providing the necessary servo force. A return spring may be provided to return the piston to its initial position after retardation. If desired, there may be a lost motion connection in the link so that servo assistance is only obtained at retardations above a predetermined value. Instead of connecting the engine and gear box to the piston directly it is possible to use an interconnected hydraulic load cell and a ram connected respectively to the engine and the piston. Other types of transducers could also be used.

In an alternative arrangement, the control mass may be a mass separate from the engine and gear box and movably mounted on the vehicle chassis to produce a servo force of varying magnitude depending on the position of the control mass relative to the chassis. The control mass may be connected to the piston directly or through load cells or transducers as described above.

BRIEF DESCRIPTION OF THE DRAWINGS

The invention will now be described in detail by way of example with reference to the accompanying drawings in which.

DESCRIPTION OF THE PREFERRED EMBODIMENTS

Figure 1:
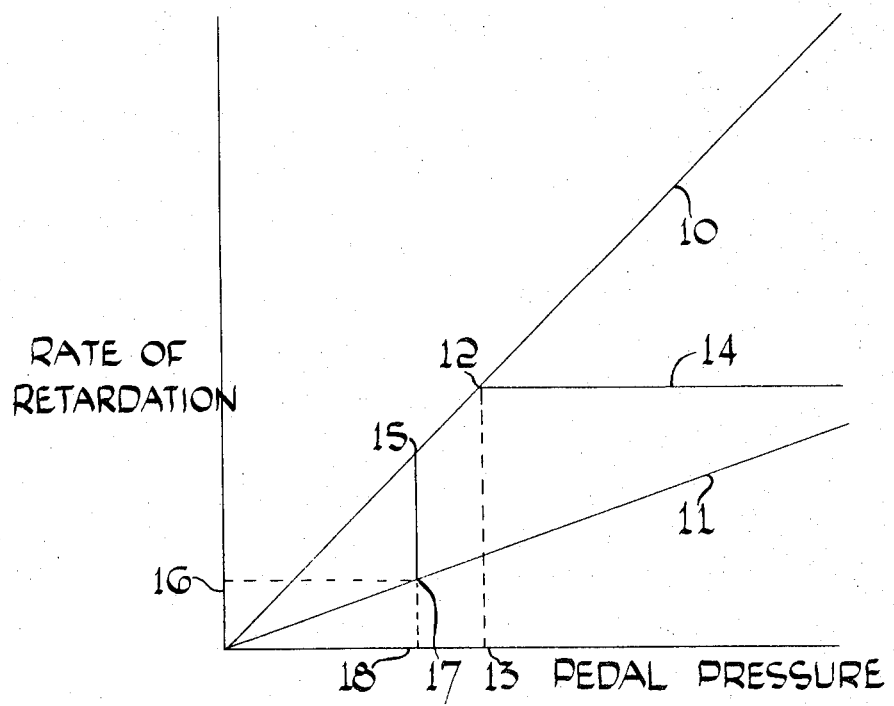
FIG. 1 is a graph of the rate of retardation of a vehicle against the pressure applied to the brake pedal to illustrate the operation of a system embodying the invention.

The operation of the system will first be described with reference to FIG. 1 which is a graph of pedal pressure against rate of retardation. The line 10 is the predetermined retardation characteristic of the vehicle under predetermined conditions, i.e., this is the characteristic retardation which will be obtained if the vehicle is retarded on a dry braking surface. The line 10 is the retardation characteristic with servo assistance. The line 11 is the retardation characteristic under similar conditions without servo assistance.

Let it be assumed that the driver generally increases the pedal pressure and the rate of retardation gradually increases substantially along the line 10 until the point 12. If because of the road surface, or the adhesion between the tyres and the road, an increase in pedal pressure beyond the point 13 does not increase the rate of retardation then no further servo force will be applied and the rate of retardation will remain constant on the line 14 as the pedal pressure is increased.

In another example, if the pedal pressure is increased from zero until a retardation corresponding to the point 15 on the line 10 is obtained and the vehicle travels over a patch of slippery road where the rate of retardation drops to or below the value indicated by the line 16, the servo magnification will drop to unity i.e. the rate of retardation will drop to a point 17 on the line 11. As the vehicle moves out of the path of slippery road then the rate of retardation will increase and the pedal pressure corresponding to the point 18 will again produce a retardation equivalent to the point 15. If there is a gradual decrease in retardation from the point 15 to the point 17 then there will be a gradual decrease in the servo assistance for the constant pedal pressure represented by the point 18.

In fact, the rate of retardation will not follow a straight line as shown which is a predetermined ideal condition. The rate of retardation will follow a staircase form approximating to the line 10 in a known manner.

Figure 2:
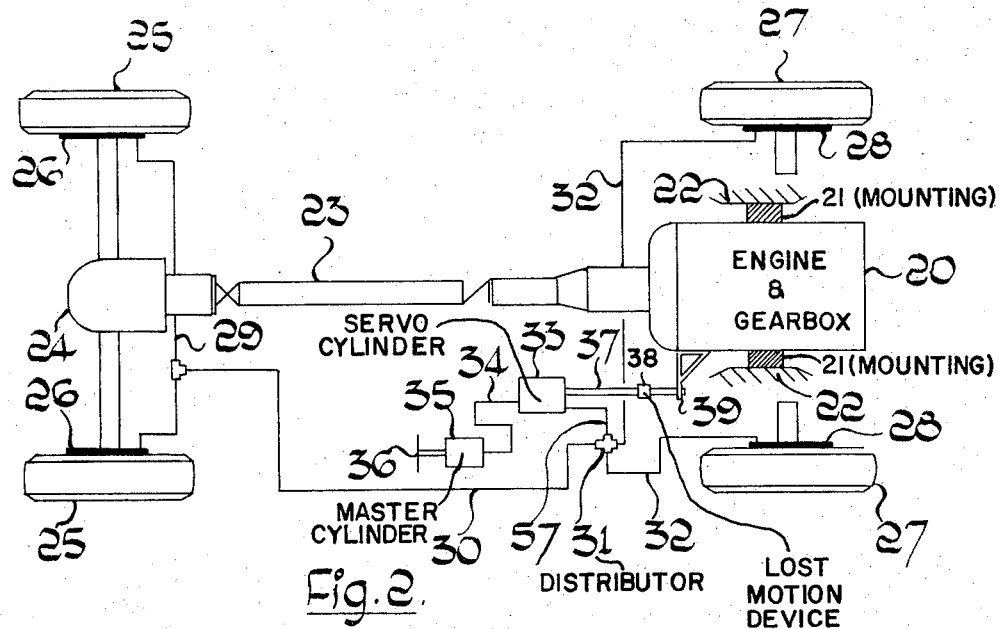
FIG. 2 is a diagrammatic vehicle layout illustrating one embodiment of the invention.

Referring now to FIG. 2 the vehicle there shown diagrammatically has an engine and gear box unit 20 which is resiliently mounted by mountings 21 on the vehicle chassis, part of which is indicated at 22. The mountings 21 allow the unit 20 to move forwardly and rearwardly relative to the chassis 22. The unit 20 is connected by a transmission indicated generally at 23 to a rear axle 24 carrying rear wheels 25. The rear wheels 25 have wheel braking means 26 which may be in the form of disc or drum brakes.

The chassis also has front wheels 27 which have wheel braking means 28 which may also be drum or disc brakes. Pipes 29 and 30 connect the braking means 26 to a distributor 31 and the latter is also connected by pipes 32 to the braking means 28. The distributor is connected to the output from a servo-cylinder 33 which will be described below and the servo-cylinder in turn is connected by a pipe 34 to a conventional master cylinder 35 which in turn is connected to a brake actuator in the form of a brake pedal 36.

A tension link 37 containing a lost motion device 38 is connected at one end to a bracket 39 on the unit 20 and at its other end to a piston of the servo-cylinder 33 which will be described below.

Figure 3:
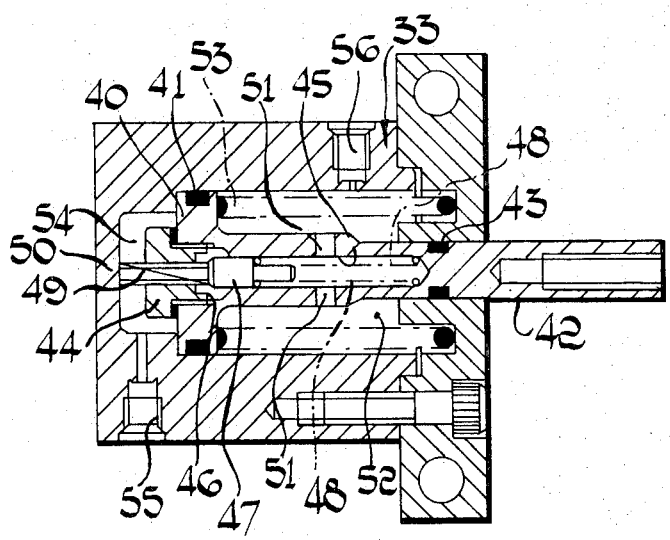
FIG. 3 is a section through a servo cylinder shown in FIG. 2.

Referring now to FIG. 3, the cylinder 33 contains a piston 40 carrying a ring seal 41. A piston rod 42 carries a seal 43 which engages a bore in the end wall of the cylinder and is connected to the tension link 37. A valve seat member 44 is received in a bore 45 in the piston rod 42 and provides a valve seating 46 with which cooperates a valve member 47 urged to the left by a valve spring 48. When the piston 40 is in its extreme left-hand position as shown a projection 49 of the valve member 47 engages the end wall 50 of the cylinder and holds the valve member off the seat 46 by a small distance. As soon as the piston 40 has moved to the right by a small distance the projection 49 leaves the wall 50 and the valve member 47 engages the seat 46. Ports 51 extend from the bore 45 into a chamber 52 formed in the right hand end of the cylinder 33. A return spring 53 acts on the piston 40 urging it to the left in FIG. 3. A chamber 54 is provided at the left hand end of the cylinder and is connected to the master cylinder 35 via a port 55. The chamber 52 is connected to the distributor 31 via a port 56 and a pipe 57.

The brakes are operated in the normal manner by pressing the pedal 36 which displaces hydraulic fluid from the master cylinder 35 along the line 34 into the chamber 54 in the cylinder 33. The fluid flows through the bore of the valve seat member 46, into the bore 45, through the ports 51 and then out of the cylinder through the port 56 and the pipe 57 to the distributor 31 and from the distributor 31 via the pipes 29, 30 and 32 to the wheel braking means 26 and 28. As the vehicle commences its retardation the unit 20 will move forwardly relative to the chassis 22, this movement being permitted by the resilient mountings 21. The piston 40 in the cylinder 33 will move to the right in the cylinder since it is connected to the unit 20 by the tension link 37. The fluid in the chamber 52 will be trapped since the valve member 47 will seat on the valve seat member 46 and pressure will be generated in the chamber 52 which will be communicated to the wheel braking means 26 and 28 to increase the braking force. It will be appreciated that the greater the rate of retardation the further will the piston 40 move to the right in the cylinder 22 and the greater will be the servo assistance. If the vehicle is on a dry road then the relation between pedal pressure and rate of retardation of the vehicle will follow the line 10 in FIG. 1 as described above. Should the vehicle hit a slippery patch of road then the retardation of the vehicle will decrease and there will be relative movement between the unit 20 and the chassis 22 so that the piston 40 will move to the left in the cylinder 33 thus reducing the servo assistance. If the retardation decreases, for a given pedal pressure, to or below the line 11 then the servo assistance will be zero.

When the brakes are released, the spring 53 will return the piston 40 to the left hand position shown in FIG. 3 and the valve member 47 will be raised from its seat in the valve seat member 46 by engagement of the projection 49 with the wall 50 so that hydraulic fluid can return to the master cylinder 35 as the brakes come off.

The lost motion connection 38 provided in the link 37 is so arranged as to prevent movement of the piston under normal movements of the engine when there is no retardation on the vehicle. This lost motion connection may be omitted.

Figure 4:
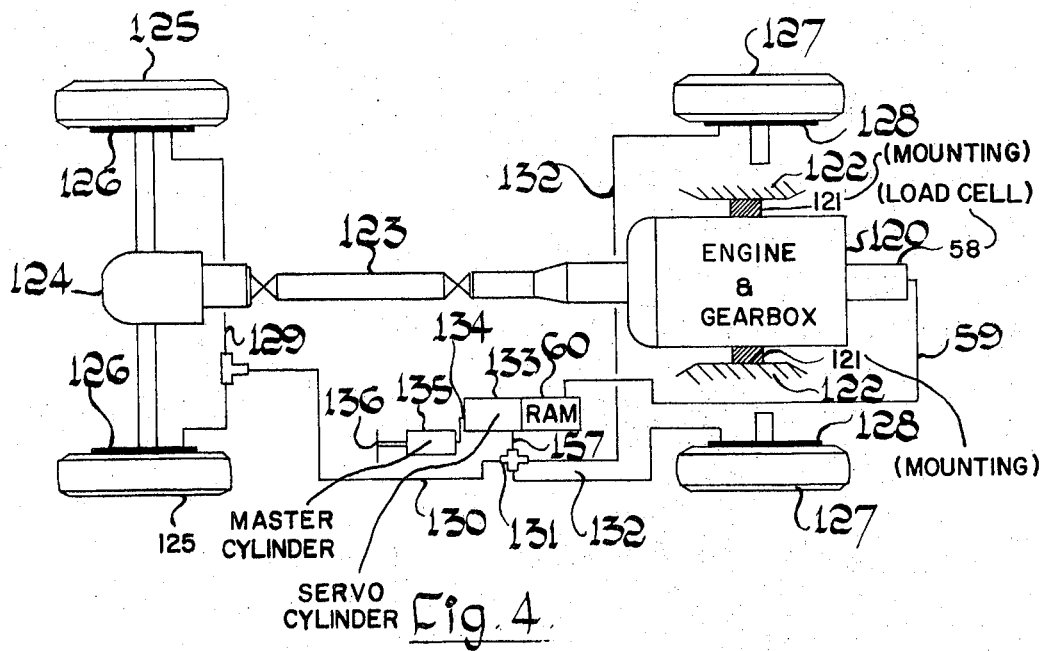
FIG. 4 is a diagrammatic layout similar to FIG. 2 but showing a second embodiment of the invention.
Figure 5:
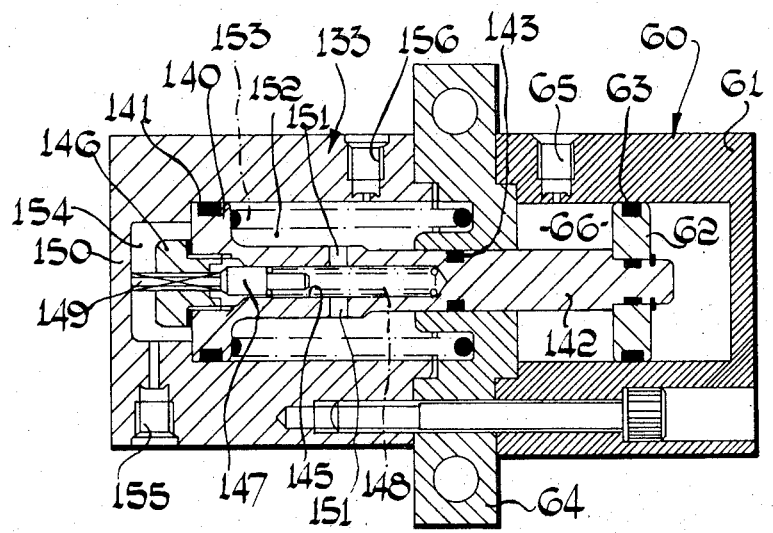
FIG. 5 is a section through a servo cylinder used in the embodiment of FIG. 4.

Referring now to FIGS. 4 and 5, these show a system which is similar to that of FIGS. 2 and 3 except that the engine and gear box unit is not connected mechanically to the servo-cylinder but is connected through hydraulic load cells. Parts in FIGS. 4 and 5 which are substantially identical to parts in FIGS. 2 and 3 are indicated by the reference numerals of FIGS. 2 and 3 increased by 100.

Referring now to FIGS. 4 and 5, parts which are identical therein to those described in relation to FIGS. 2 and 3 will not be further described. Referring to FIG. 4, the unit 120 is connected to a hydraulic load cell 58 which in turn is connected by a line 59 to a hydraulic ram 60 shown in FIG. 5. The ram 60 comprises a cylinder 61 in which is mounted a piston 62 carrying a peripheral seal 63. The cylinder 61 is mounted on the end wall 64 of the cylinder 133 and the piston 62 is mounted on the end of the piston rod 142. A port 65 is connected to the line 59 and leads to a chamber 66 between the pistons 62 and the end wall 64.

Movement of the unit 120 forwardly relative to the chassis 122 displaces hydraulic fluid from the load cell 58 along the line 59 to the chamber 66 and thus moves the piston 62 to the right in the cylinder 61 and thus moves the piston 141 to the right which provides servo assistance in the manner described in relation to FIGS. 2 and 3. Apart from the indirect connection between the unit 120 and the piston 141 the arrangement of FIGS. 4 and 5 operates in a manner similar to the arrangement of FIGS. 2 and 3.

Figure 6:
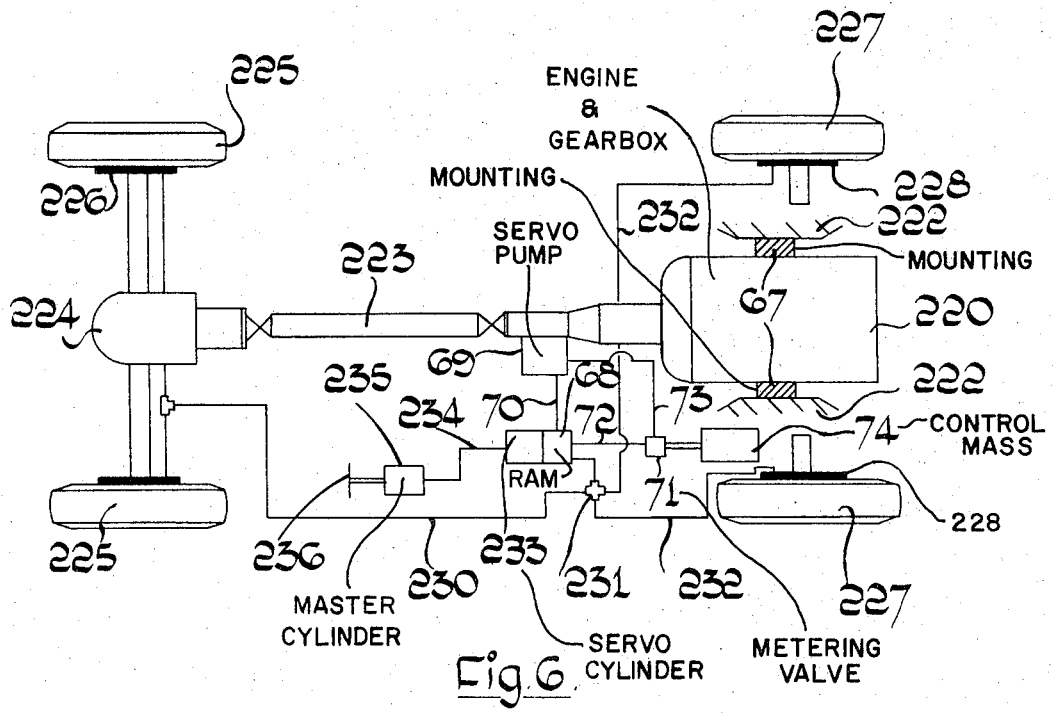
FIG. 6 is a diagrammatic layout similar to FIGS. 2 and 4 but showing a third embodiment of the invention.

FIG. 6 shows a modified arrangement which instead of using the mass of the engine and gear box to provide the servo force, uses a servo loop. In FIG. 6 parts which are similar to those shown in FIG. 1 are shown with the same reference number to which 200 has been added. In FIG. 6 the engine and gear box unit is mounted in the chassis in a conventional manner by mountings 67. The servo cylinder 233 is provided with a hydraulic ram 68 similar to the ram 60 in FIGS. 4 and 5 and the ram cylinder is connected to the output of a servo pump 69 by a line 70 and to a metering valve 71 by a line 72. The valve 71 is connected to the input of the pump by a line 73.

The pump 69, ram 68 valve 71 and the lines 70, 72 and 73 provide a servo loop which is associated with a reservoir, not shown. The pump 69 is driven from the transmission 223 and the valve is operated by a control mass 74 which is mounted on the chassis in such a manner that its position relative to the chassis depends on the rate of retardation of the vehicle just as the position of the unit 20 or 120 in FIGS. 2 and 3 depends on such retardation. The control mass 74 is connected to the valve by a link 75. When the vehicle is not being retarded the valve 71 is open and the pump merely pumps liquid round the servo loop. As the vehicle retards the position of the control mass charges which gradually closes the valve thus increasing the pressure in the ram 68 and increasing the servo magnification. This magnification depends on the setting of the valve which in turn depends on the position of the control mass 74.

It will be seen that the invention provides a simple and effective anti-skid braking system in which the time lag between incipient skidding and relief of the braking force is cut down to a minimum.

We claim:

1. A braking system for a vehicle having a chassis, the system comprising wheel braking means, a brake actuator for driver operation to activate the wheel braking means, a servo mechanism interposed between said actuator and said braking means to magnify the force applied to the actuator and to apply the magnified force to the braking means, said servo mechanism comprising a cylinder, a piston slidably disposed within the cylinder thus defining a variable volume portion of the cylinder which is connected to the wheel braking means and to the brake actuator via a shut-off valve, one of the piston and the cylinder being rigidly mounted on said chassis, a link for connecting the other of the piston and the cylinder to a control means for varying the force magnification effected by the servo mechanism, the control means comprising a mass and means mounting the mass on the chassis such that the position of the mass relative to said chassis depends on the rate of retardation of the vehicle, the mass moving to close the shut-off valve during retardation of the vehicle thus cutting off communication between the variable volume portion of the cylinder and the brake actuator, and to relatively displace the piston and the cylinder so as to reduce the volume of said portion of the cylinder connected to the wheel braking means thus to magnify the force applied to the actuator in a manner dependent on the rate of retardation of the vehicle.

2. A system according to claim 1 in which the vehicle comprises an engine and gearbox and in which said mass comprises said engine and gearbox.

3. A system according to claim 2 in which said link comprises a hydraulic line which communicates movements of said engine and gearbox relative to said chassis to one of said piston and cylinder.

4. A system according to claim 1 including a servo pump whose output is metered by a valve whose position is controlled by the control mass.

* * * * *